B. G. VAUGHAN.
SETTING HEAD FOR MATCH MAKING MACHINES.
APPLICATION FILED SEPT. 12, 1910.

1,010,824.

Patented Dec. 5, 1911.

2 SHEETS—SHEET 1.

Witnesses:
Geo. R. Ladson.
Wells R. Church.

Inventor,
Bernard G. Vaughan.
By Paul Bakewell, Atty.

B. G. VAUGHAN.
SETTING HEAD FOR MATCH MAKING MACHINES.
APPLICATION FILED SEPT. 12, 1910.
1,010,824.
Patented Dec. 5, 1911.
2 SHEETS—SHEET 2.
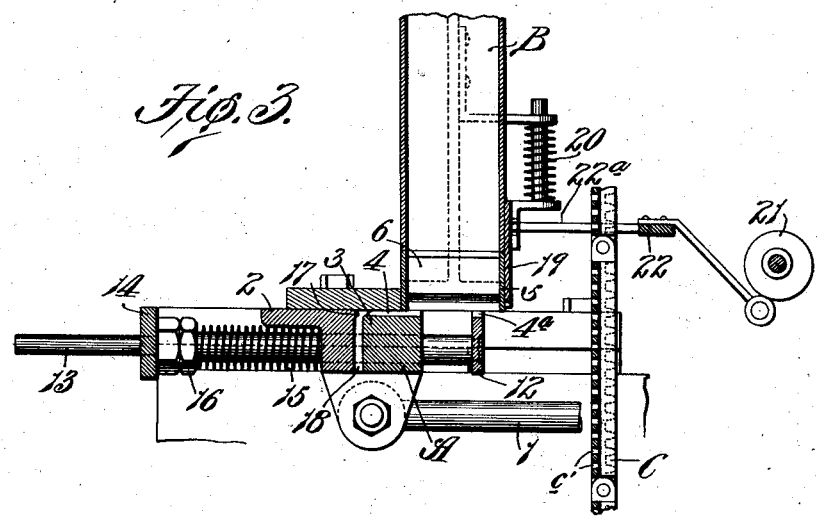
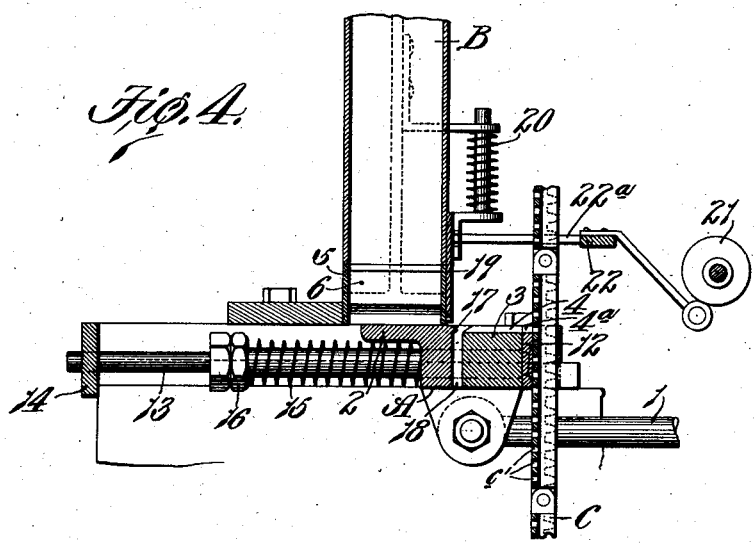
Witnesses:
Geo. R. Ladson
Wells L. Church
Inventor,
Bernard G. Vaughan.
By Paul Bakewell Atty.

UNITED STATES PATENT OFFICE.

BERNARD G. VAUGHAN, OF JOLIET, ILLINOIS, ASSIGNOR TO NATIONAL MATCH COMPANY, OF JOLIET, ILLINOIS, A CORPORATION OF ILLINOIS.

SETTING-HEAD FOR MATCH-MAKING MACHINES.

1,010,824.     Specification of Letters Patent.     Patented Dec. 5, 1911.

Application filed September 12, 1910. Serial No. 581,537.

*To all whom it may concern:*

Be it known that I, BERNARD G. VAUGHAN, a citizen of the United States, residing at Joliet, Will county, Illinois, have invented a certain new and useful Improvement in Setting-Heads for Match-Making Machines, of which the following is a full, clear, and exact description, such as will enable others skilled in the art to which it appertains to make and use the same.

This invention relates to match-making machines, and particularly to the setting heads used in such machines for inserting the match-splints in the carrier which conveys the splints to the dipping tank.

One object of my invention is to provide a setting head having means for preventing the match-splints from tilting relatively to the head during the operation of inserting the splints in the carrier which conveys them to the dipping tank.

Another object is to provide a setting head which is so constructed that the short match-splints and the dust and splinters mixed with the splints can escape from the setting head easily during the operation of feeding the splints to the setting head. And still another object of my invention is to provide a setting head having a movable member or portion arranged in front of same and adapted to act as a support for the front ends of the match-splints when the splints are fed onto the setting head.

Other objects and desirable features of my invention will be hereinafter pointed out.

Figure 1:
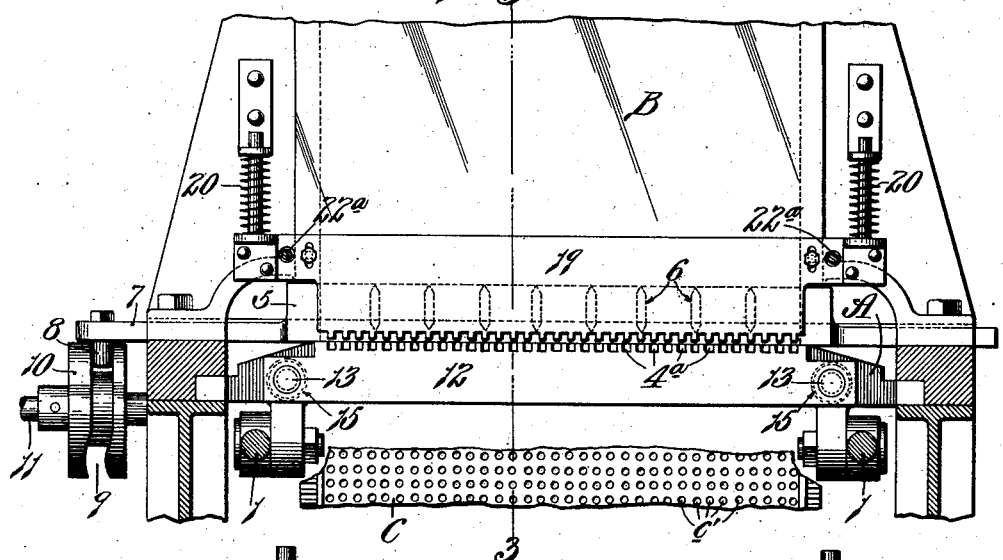
Figure 2:
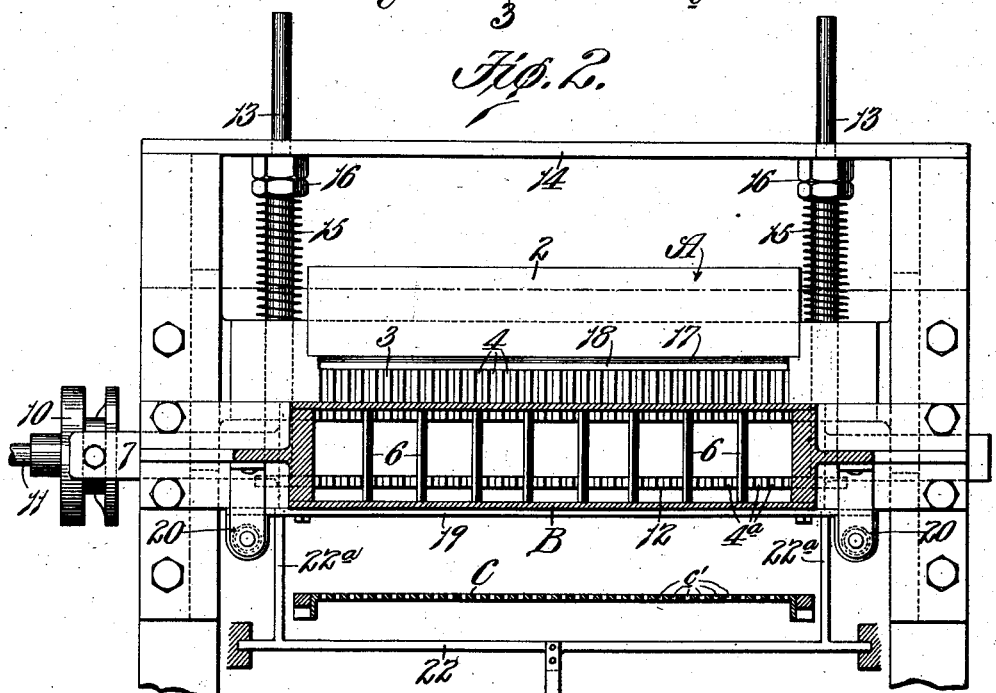

Figure 1 of the drawings is a front elevational view of a portion of a match-making machine provided with a setting head constructed in accordance with my invention; Fig. 2 is a top plan view of the mechanism shown in Fig. 1; Fig. 3 is a vertical sectional view taken on approximately the line 3—3 of Fig. 1, showing the setting head arranged in receiving position; and Fig. 4 is a view similar to Fig. 3 but with the setting head arranged in delivering position.

Referring to the drawings which illustrate the preferred form of my invention, A designates the setting head of a match-making machine which receives match-splints from a hopper B and inserts said splints in the carrier C which conveys the splints to the dipping tank, not shown. Said setting head consists of a horizontally disposed member that is arranged under the hopper B and which is moved toward and away from the carrier C by suitable means such, for example, as links 1. The top face of the rear portion 2 of the setting head A is flat so as to provide a smooth supporting surface for the match-splints in the hopper when the head is in delivering position, and the top face of the front portion 3 of said head is provided with parallel match-splint-receiving grooves 4 which extend transversely of the head, said grooves being of a depth approximately equal to the cross section of the match-splints so that said splints will not project above the top face of the setting head when they are arranged in operative position on the setting head. A feeder 5 is arranged between the setting head and the hopper B so as to agitate the match-splints and feed them to the setting head, the feeder herein shown consisting of a comparatively shallow hopper provided with vertically disposed partitions 6 and having a laterally projecting arm 7 at one end that carries a roll 8 which projects into a double cam groove 9 formed in a cam block 10 that is secured to a driven shaft 11, said cam groove being so formed that the feeder 5 is moved transversely of the setting head during the return stroke of the setting head. The particular construction of the feeder, the hopper and the match-splint-carrier C is immaterial, however, so far as my present invention is concerned, and therefore, I do not wish it to be understood that my improved setting head is limited to use with a match-making machine of the particular design herein shown.

The setting head A is provided with a movable member 12 arranged in front of same, as shown in Fig. 3, and provided on its upper edge with grooves 4ᵃ that aline with the grooves 4 in the top face of said head, said member 12 being provided with guide-rods 13 that project rearwardly through openings in the head A and also through openings in a stationary abutment 14, coiled expansion springs 15 being arranged on said guide-rods between the head and stops 16 on said rods so as to hold the movable member 12 in engagement with the head A during a certain period of the cycle of operations of the machine.

To eliminate the possibility of the match-splints tilting relatively to the setting head in case the splint-receiving openings $c'$ in the carrier C are not arranged in exact alinement with the splints during the operation of inserting the splints in the carrier, I provide the setting head with a device or devices which bite into the rear ends of the match-splints when the setting head moves toward the carrier C to insert the splints in said carrier.

In the embodiment of my invention herein shown, the setting head is provided with a horizontally disposed tooth 17 that is arranged at the rear ends of the grooves 4 in the top face of the setting head but it will, of course, be obvious that the setting head could be provided with a separate tooth or projection for each groove instead of a long continuous tooth 17, as herein shown. When the setting head moves forwardly or toward the carrier C the tooth 17 bites into the rear ends of the match-splints and thus prevents the rear ends of the splints from tilting upwardly in case the splint-receiving openings $c'$ in the carrier do not aline perfectly with the front ends of the splints. I prefer to provide the setting head with a slot 18 arranged at the rear ends of the grooves 4 and extending the entire width of the head so as to form a passageway through which dust and small splinters can escape and thus reduce the liability of the setting head becoming clogged. The head A can either be formed from a single casting or piece of metal, or, the rear portion 2 and the front portion 3 of the head can be formed from separate pieces of metal and connected together in any suitable manner so as to form practically a one-piece head.

The machine herein shown is provided with a comb 19 arranged on the front wall of the hopper for cleaning out the grooves 4 in the setting head or removing match-splints that have become lodged therein when the setting head moves rearwardly, said comb being depressed by means of coiled expansion springs 20 and elevated by means of a cam 21 that actuates a bar 22 provided with arms $22^a$ which engage said comb.

When the setting head moves rearwardly the stops 16 and the guide-rods 13 engage the stationary abutment 14 and thus arrest the movable member 12 when it reaches the position shown in Fig. 3, the setting head continuing its rearward movement until it reaches the position shown in Fig. 3, and thus causing a space or opening to be formed between the member 12 and the front face of the setting head. The agitation or movement to which the feeder 5 is subjected at this period in the cycle of operations of the machine causes the match-splints to move downwardly and fill the grooves in the upper edge of the member 12 and in the front edge of the setting head, the short match-splints, dust and splinters which are mixed with the splints dropping downwardly through the opening between the member 12 and the front wall of the hopper B and through the opening between the member 12 and the front face of the head A. The forward movement of the setting head causes the match-splints arranged in the grooves therein to be inserted in the splint-receiving openings in the carrier C, and the tooth 17 on said head bites into the rear ends of the match-splints and prevents them from tilting upwardly in case the front ends of the splints do not aline perfectly with the splint-receiving openings in the carrier C. The flat rear portion 2 of the setting head passes under the feeder 5 and thus prevents the splints from falling out of the feeder, and the setting head is so proportioned that when it is in its delivering position, as shown in Fig. 4, a space is formed between the rear edge of same and the rear wall of the feeder 5 through which the short match-splints, splinters and dust can escape.

With a setting head of the construction above described the match-splints cannot tilt relatively to the head in case the carrier C is not adjusted accurately for the setting head is provided with a device or devices which bite into the rear ends of the splints when the setting head moves toward the carrier to insert the splints in same.

Another advantage of such a setting head is that the splints are only supported adjacent their opposite ends when they are deposited on the setting head so that any splints which are not of the proper length will fall through the space between the front side of the head and the member 12, the opening between the member 12 and the front wall of the feeder permitting the dust and splinters which are mixed with the splints to escape and thus not drop onto the head. An opening is also provided between the rear edge of the head and the rear wall of the feeder when the head is in its delivering position so that the dust, splinters and short splints in the rear portion of the feeder can escape without passing onto the setting head, the slot 18 in the head also forming another means of escapement for the dust and splinters.

Having thus described my invention, what I claim as new and desire to secure by Letters Patent is:

1. A setting head for match-making machines, provided with means which bites into the match-splints and prevents them from tilting during the operation of inserting the splints in the carrier which conveys them to the dipping tank.

2. A setting head for match-making machines, constructed to hold a plurality of match-splints in parallel relation to each other, and means on said head which bites into the splints and prevents them from tilting relatively to the head during the operation of inserting them in the carrier which conveys the splints to the dipping tank.

3. A setting head for match-making machines provided with splint-receiving grooves, and also with means which bites into the rear ends of the splints and prevents them from tilting upwardly during the operation of inserting the splints in the splint-carrier of the machine.

4. A setting head for match-making machines provided with grooves or pockets for receiving match-splints, and means which bites into the rear ends of the splints when the setting head moves toward the splint-carrier of the machine.

5. A setting head for match-making machines provided in its top face with splint-receiving grooves, and means arranged adjacent the rear ends of said grooves for biting into the rear ends of the splints when the setting head moves into delivering position.

6. A setting head for match-making machines, provided in its top face with splint-receiving grooves whose rear ends are closed, an open-ended slot or channel formed in said head adjacent the rear ends of said grooves for permitting dust and splinters to escape from said grooves and pass downwardly through the head, and means at the rear ends of said grooves which bites into the match-splints and prevents them from tilting during the operation of inserting the splints in the carrier which conveys them to the dipping tank.

7. In a match-making machine, a match-splint-carrier, a setting head adapted to move toward and away from said carrier and provided with means for holding match-splints in a certain position, and a tooth on said head which engages the match-splints and prevents them from tilting relatively to the head during the operation of inserting the splints in said carrier.

8. In a match-making machine, a match-splint-carrier, a setting head adapted to move toward and away from said carrier and provided in its top face with grooves for receiving match-splints, and a tooth extending transversely of the setting head and arranged adjacent the rear ends of the grooves therein for biting into the rear ends of the match-splints so as to prevent them from tilting relatively to the head.

9. In a match-making machine, a container for holding a mass of match-splints, a match-splint-carrier, a setting head arranged under said container and provided with a movable member arranged in front of same for supporting the front ends of the match-splints, and means for causing said movable member to come to rest before the setting head completes its rearward stroke so that a space will be formed between said movable member and head through which the short match-splints and dust can escape.

10. In a match-making machine, a container for holding a mass of match-splints, a match-splint-carrier, a setting head for receiving splints from said container and conveying them to said carrier, a movable member carried by said head and arranged in front of same to support the front ends of the match-splints, and means for causing said movable member to come to rest in such a position when the setting head moves toward the container that openings are formed between said member and setting head and between said member and the front wall of the container through which the short match-splints and dust can escape.

11. In a match-making machine, a container for holding a mass of match-splints, a match-splint-carrier, a reciprocating setting head arranged under said container for receiving match-splints from said container and inserting them in said carrier, a movable member mounted on said setting head and arranged in front of same, and means for causing said movable member to be separated from the setting head when the setting head moves toward its receiving position.

12. In a match-making machine, a container for holding a mass of match-splints, a match-splint-carrier, a reciprocating setting head arranged under said container, a movable member carried by said setting head and arranged in front of same, said member and setting head being provided with match-splint-receiving grooves, means for causing said movable member to be separated from the setting head when the setting head moves toward its receiving position, a portion on said setting head which closes the lower end of said container when the setting head is in its delivering position, said portion having a smooth top face, and means on the setting head for preventing the match-splints from tilting relatively to said head during the operation of inserting them in the carrier.

13. In a match-making machine, a hopper for holding match-splints, a match-splint-carrier, a reciprocating setting head arranged under said hopper and provided with splint-receiving grooves, means on said head which bites into the rear ends of the splints so as to prevent them from tilting during the operation of inserting them in the carrier, a movable member mounted on said head and arranged in front of same for supporting the front ends of the match-splints, and means for moving said member toward and away from the head during the cycle of operations of the machine.

14. In a match-making machine, a splint-carrier, a container for holding a mass of match-splints, a setting head for receiving match-splints from said container and inserting them in said carrier, splint-receiving grooves on said setting head, means on said head which bites into the match-splints and prevents them from tilting relatively to said head during the operation of inserting them in the carrier, and means for cleaning out said grooves when the setting head is moved away from the carrier.

In testimony whereof I hereunto affix my signature in the presence of two witnesses, this 8th day of September, 1910.

BERNARD G. VAUGHAN.

Witnesses:
L. A. SHERWOOD,
H. LESER.

Copies of this patent may be obtained for five cents each, by addressing the "Commissioner of Patents, Washington, D. C."